Feb. 24, 1970  L. E. VIS  3,497,237
FRONT-FENDERS FOR WIDE-FRONT TRACTORS
Filed Feb. 28, 1968  5 Sheets-Sheet 1

INVENTOR
LARRY E. VIS

BY *Jene D. Watson*
ATTORNEY

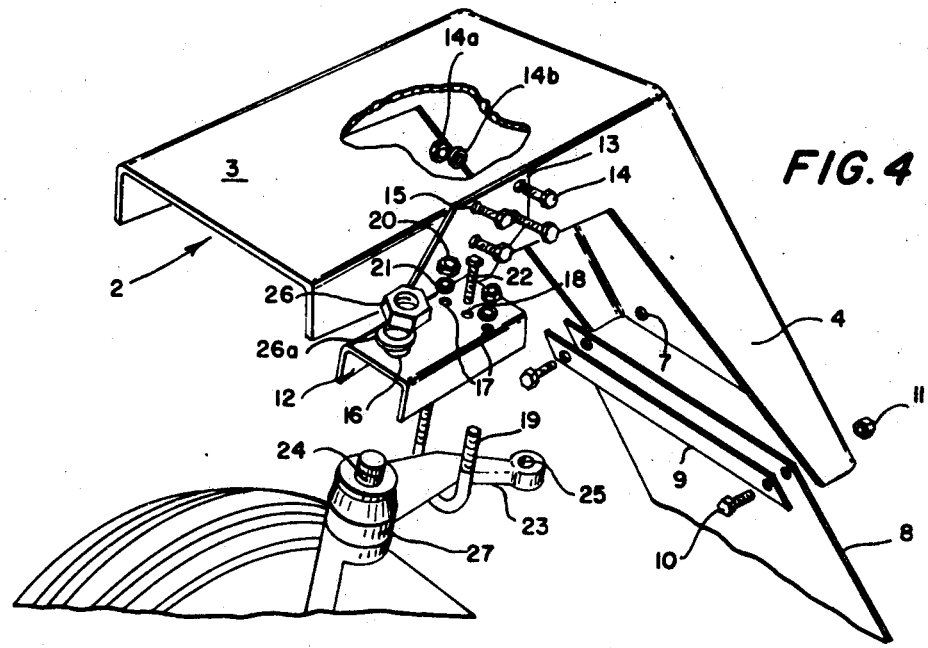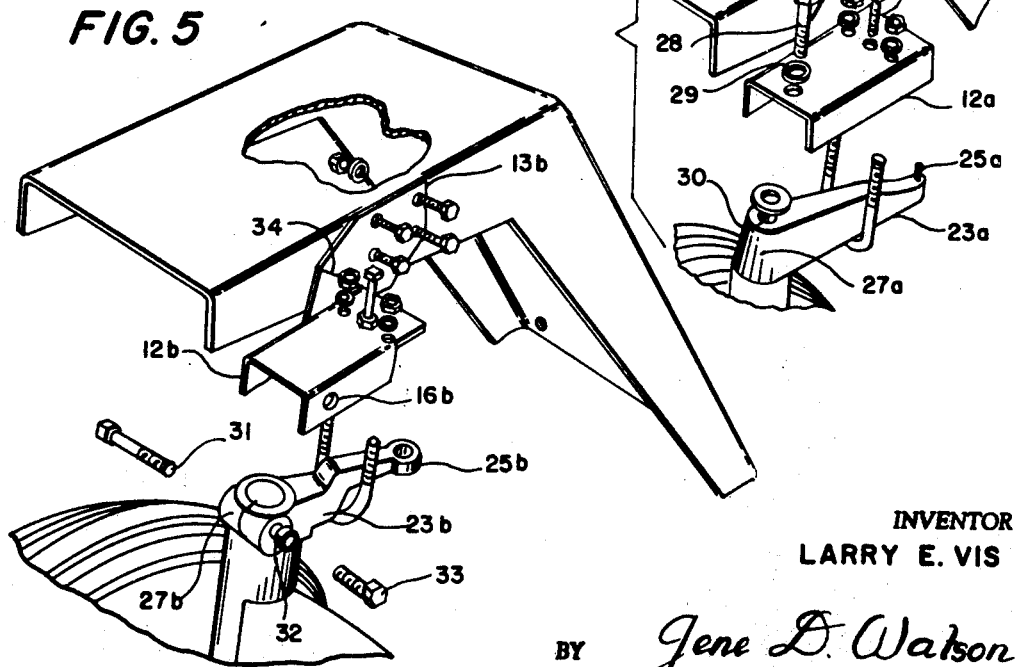

INVENTOR
LARRY E. VIS

BY Jene D. Watson

ATTORNEY

Feb. 24, 1970 L. E. VIS 3,497,237
FRONT FENDERS FOR WIDE FRONT TRACTORS
Filed Feb. 28, 1968 5 Sheets-Sheet 4

INVENTOR
LARRY E. VIS

BY Gene D. Watson
ATTORNEY

United States Patent Office

3,497,237
Patented Feb. 24, 1970

1

3,497,237
FRONT FENDERS FOR WIDE FRONT TRACTORS
Larry E. Vis, Worthington, Minn., assignor to Brobst Company, Lincoln, Nebr., a corporation of Nebraska, and Soderholm Manufacturing Co., Inc., Worthington, Minn., a corporation of Minnesota
Filed Feb. 28, 1968, Ser. No. 709,008
Int. Cl. B62d 25/16
U.S. Cl. 280—152                                22 Claims

ABSTRACT OF THE DISCLOSURE

A front fender assembly for wide front tractors comprises a mounting bracket which is mounted on the steering arm of a front wheel and supports a fender which is cantilevered out over and behind the adjacent wheel to move with the wheel and prevent throw-back of material by the wheel without hampering visibility and maneuverability of the wheel. A channel shaped bracket is adaptable to numerous standard tractors, and optionally includes an adjustable feature to facilitate leveling of the fender. The bracket is attachable to the steering arm at least in part through a bolt which is a standard connecting member is practically all standard steering arm assemblies. Optional hardware, such as spacers, replacement bolts, etc., can adapt the same general bracket to steering arms of different sizes and configurations.

FIELD OF THE INVENTION

This invention relates to front fenders for tractors of the wide front or wide wheel type, which fenders can be provided as standard equipment on new tractors or as attachment accessories for existing tractors. The invention is primarily directed to mounting arrangements for such fenders whereby the fenders turn with the steering movement of the front wheels and are easily mountable on a tractor with ordinary tools that are available to every farmer.

BACKGROUND OF THE INVENTION

There are presently in use numerous models of tractors of the wide front end or wide axle front end type, that is, conventional tractors of the type where the steerable front wheels are located laterally outwardly of the body structure of the tractor, as opposed to the tricycle type where the front wheels are closely spaced and located beneath the front body structure of the tractor. Such wide front or wide wheel tractors are particularly adapted for use in row crop farming. Most, if indeed not all, of these wide wheel tractors have exposed or bare front wheels, that is, they are not provided with fenders or mud guards on the front wheels, and thus there is nothing to prevent throw-back of mud, snow and slush, rocks and gravel, oil and tar, etc. This presents a particularly undesirable state of affairs especially when the tractor is being steered through a turning movement, and the throw-back from one of the wheels is aimed directly at the operator. As a result, many farmers tend to operate their tractors at substantially slower speeds when operating in muddy conditions. The advent of larger and faster tractors, some front wheel drive tractors, and the need to drive longer distances in working larger farms and scattered farms

2 which are sometimes several miles apart, have contributed further to the problem, and this occurs at a time when most farmers desire to keep expensive tractors and tractor accessories relatively clean, quite apart from their desire to protect themselves from the front wheel throw-back. Thus, there exists a definite need for some form of protective device over the front wheels of wide wheel tractors. However, it is necessary that any suitable protective device not hamper the visibility and maneuverability of the front wheels.

Fixed fenders could be provided on such tractors to overcome the throw-back problem, but it would be difficult, if at all possible, to provide fixed fenders which would not create further problems. Thus, a fixed fender would block the operator's view of the front wheel due to the fact that the fixed fender would have to be quite large in order completely to confine the throw-back for all positions of the wheel, since a front wheel must be able to turn through a large radius in order to provide the necessary maneuverability for the tractor. By excluding the front wheels from view, a fixed front fender would preclude the necessary accuracy when driving down rows and in furrows. Thus, stationary fenders would not appear to fill the existing need or solve the existing problems in a satisfactory manner.

Mud guard attachments for tricycle type tractors are known in the art, for example, as shown in U.S. Patent No. 2,530,857 (Campbell). Such tractors have the front wheels closely spaced on opposite sides of a rather large and usually flat-bottomed steering post, and the mud guard of the Campbell patent is attached to the bottom of this steering post. However, even though the need is greater in the wide wheel tractor than in the tricycle type tractor, to my knowledge no one has come forth with a satisfactory arrangement for such wide wheel tractors.

SUMMARY OF THE INVENTION

The instant invention is believed to constitute a workable solution to the foregoing problems by providing a movable front fender assembly for wide wheel tractors, which can be supplied by manufacturers with new tractors, or which can be sold separately as an attachment accessory for practically any standard wide wheel tractor. The invention not only provides a fender and mud guard for such wide wheel tractors, but its construction and arrangement is such that it is strong enough for an operator to stand on, thus providing a step from which to check and service the tractor. In addition to the advantage of preventing throw-back from the front wheels, the invention in use tends to hold down swirling dust under dry field conditions. Since the fender of the invention turns with its wheel, it is always in a position to do the most good.

The fender itself of the instant invention is supported in cantilever fashion over the wheel by a mounting bracket which is easily attached to the adjacent steering arm. The mounting bracket is attached at least partially through a standard bolt or threaded spindle carried by conventional steering arms either at the pivoted end of the steering arm or at the free end where it is connected to the tie rod. The fender assembly does not hamper the maneuverability of the wheel, and since it moves with the wheel, its size is such that it does not hamper the operator's view of the wheel. A channel shaped bracket, either by slight modification or through simple accessories, can be adapted for use on numerous models of tractors with different steering arms. Thus one embodiment of the invention includes an adjustment feature to compensate for different configurations and orientations of steering arms on different tractors, and thus permits leveling of the fender on different tractor models and on different tractors of the same model, using the same basic mounting bracket.

Other and further features, advantages, and the like, of the invention will become apparent from the ensuing description and illustrations of exemplary embodiments of the invention. I have set forth with particularity and distinctness in the appended claims those features which I consider characteristic of the invention, but the invention itself, both as to its construction and its manner of use, will be best understood by those skilled in the art from a consideration of the description and illustrations.

DESCRIPTION OF THE DRAWINGS

In the drawings:

FIGURE 4 is an essentially diagrammatic exploded perspective view of one embodiment of the invention, illustrating its construction and its manner of attachment to the steering arm of a well known and commercially available tractor.

FIGURES 4a, 5, 6, 6, 8, 9, and 10 are views corresponding to FIGURE 4, but of other embodiments of the invention for use with other models of well known and commercially available tractors.

DESCRIPTION OF THE PREFERRED EMBODIMENTS

Figure 1:
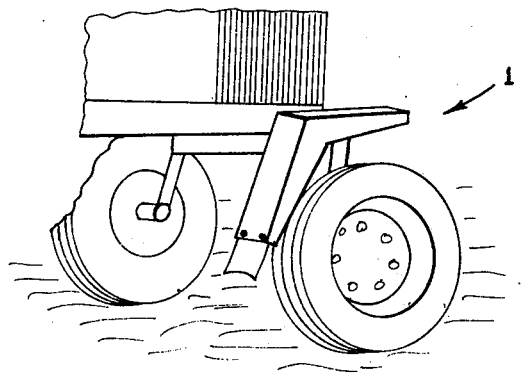
FIGURE 1 is a general perspective view from the right-hand rear quarter of an embodiment of the invention as mounted on a conventional tractor.
Figure 2:
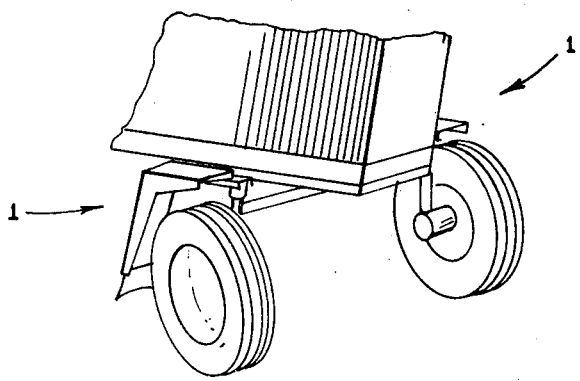
FIGURE 2 is a general perspective view from the right-hand front quarter of the same embodiment mounted on the same conventional tractor as shown in FIGURE 1.

Referring to the drawings, FIGURES 1 and 2 illustrate the general appearance of a conventional wide wheel tractor with fenders mounted thereon in accordance with the invention. It will be noted from these figures that the fenders 1 cover the two front wheels so as to prevent throw-back, but that the fenders do not hamper the operator's view, and in no manner affect the maneuverability of the front wheels.

Figure 3:
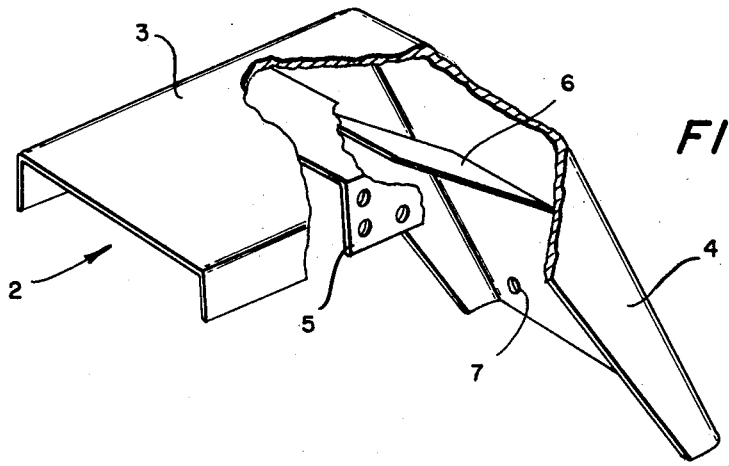
FIGURE 3 is a perspective view of an exemplary fender in accordance with the invention, broken away in part to illustrate the interior bracing.

The exemplary fender generally indicated at 2 in FIGURE 3 is in the form of a channel and includes an upper generally flat portion 3 and a rear portion 4 depending downwardly at an angle therefrom. Bolt holes 7 are provided to facilitate attaching a mud flap to the trailing edge of the fender, and will be further described in connection with FIGURE 4. A bracing member 5 and a stabilizer member 6 are welded inside the fender 2 to provide extra strength. In a preferred commercial embodiment, the fender 2 is formed of 14 gauge metal, and the brace 5 and stabilizer 6 are formed, respectively, from 5/16 inch plate and 14 gauge metal.

Referring now to FIGURE 4, this figure illustrates an exemplary arrangement for mounting a fender of the type shown in FIGURE 3 on a standard tractor of a well known type. As shown in FIGURE 4, the tractor includes a conventional steering arm 23 having a pivotally mounted end 27 and a free end 25 for connection to a conventional tie rod in the steering linkage. The threaded spindle 24, lock washer 26a and spindle nut 26 are existing parts of the standard steering arm assembly. The fender 2 is supported by a mounting bracket 12 which is mounted on the steering arm 23 for pivotal movement therewith. The mounting bracket 12 includes an upstanding tab member 13 having four bolt holes 15 formed therein to mate with corresponding bolt holes formed in the inner channel wall of the fender. Four bolts 14 pass through these mating bolt holes to receive lock washers 14b and nuts 14a to rigidly connect the fender to the tab member 13, and hence to the mounting bracket 12. The mounting bracket 12 is of channel construction to fit down over the steering arm 23. The bracket has a hole 16 formed therein to receive threaded spindle 24. The bracket is further connected to the steering arm through a U-bolt 19, the arms of which extend upwardly from beneath steering arm 23 through holes 17 formed in the mounting bracket to receive lock washers 21 and nuts 20. A set screw 22 is screwed downwardly through a threaded hole 18 so as to bear against the upper surface of the steering arm 23 between the two arms of the U-bolt 19. As shown in the lower right-hand portion of FIGURE 4, the assembly further includes a mud flap 8 which is attached to the trailing edge of the fender 2 by a mud flap retainer 9, bolts 10, and acorn nuts 11. The mud flap and the mud flap retainer are preformed with bolt holes to mate with holes 7 in the trailing edge of the fender.

In its present commercial form, the embodiment shown in FIGURE 4 is sold as an attachment kit which includes all parts shown in FIGURE 4 except the steering arm 23, threaded spindle 24, lock washer 26a, and nut 26. These are standard parts that are already on the tractor. To mount the assembly on the tractor steering arm, spindle nut 26 and lock washer 26a are removed from spindle 24, and the bracket 12 is placed on the steering arm with the spindle 24 passing upwardly through hole 16. The bracket is aligned with the steering arm, and the lock washer 26a and spindle nut 26 are placed back on the spindle, and the nut 26 is tightened on the spindle. The fender is then bolted to the tab number 13 using the four bolts 14, lock washers 14b, and nuts 14a. The U-bolt 19 is then inserted upwardly around the steering arm through the holes 17 in the bracket. Set screw 22 is screwed downwardly through hole 18. Set screw 22 and nuts 20 on the U-bolt are then adjusted so that the fender 2 is level when the wheels are straight. The mud flap and mud flap retainer are then bolted to the fender using bolt 10 and acorn nuts 11.

The mounted assembly is surprisingly strong even though the fender is in effect cantilevered out over the wheel, and is unsupported apart from its connection to the steering arm through the mounting bracket. It has been found that the assembly is strong enough to support a man, and thus the assembly provides a very convenient step for use by the operator when checking and servicing the tractor. The adjustable feature which is provided by set screw 22 and U-bolt 19 is an important feature of this embodiment since it renders the mounting bracket usable on different tractors where the steering arm may have a different inclination or a different configuration.

Referring now to FIGURE 4a the embodiment of this figure is substantially identical to the embodiment of FIGURE 4, but is shown in combination with a conventional tractor steering arm slightly different from the steering arm of FIGURE 4. In this embodiment the spindle bolt 28 and lock washer 29 are standard parts of the steering arm assembly. To mount the embodiment of FIGURE 4a, spindle bolt 28 and lock washer 29 are removed from threaded bore 30, and reinserted through the hole formed in the mounting bracket after the mounting bracket is mounted on and aligned with the steering arm. The other steps in the mounting process are the same as in the embodiment of FIGURE 4. As in the embodiment of FIGURE 4, steering arm 23a has a pivotally mounted end 27a and a pivotal end 25a for connection to a conventional tie rod in the steering linkage.

In the embodiment of FIGURE 5, the mounting bracket has been modified for mounting on the standard steering arm of a further popular make of tractor. The steering arm 23b of this tractor includes a horizontal clamping bolt 31 for tightening a steering arm mounting clamp at the pivoted end 27b of the steering arm. The mounting bracket has horizontally aligned holes 16b formed in its side walls for connecting the bracket to the pivoted end of the steering arm. Apart from the positioning of bolt holes 16b, and a bend 34 stamped in tab member 13b, the mounting bracket is substantially the same as in the previous embodiments. The fender assembly of this embodiment also includes a bolt 33 and spacer 32 for fastening one side of the mounting bracket to the steering arm. The use of spacer 32 permits fabrication of the mounting bracket of this embodiment from the same basic channel member as in other embodiments, thus avoiding the need for a different size channel for each style and size channel for each style and size of steering arm.

To mount the embodiment of FIGURE 5 on the steering arm, horizontal clamping bolt 31 is removed from the steering arm, the bracket is placed on the steering arm, and one side of the bracket is fastened to the steering arm by reinserting clamping bolt 31. The other side of the bracket is fastened by aligning the spacer 32 with hole 16b, the spacer being between the steering arm and the channel wall of the bracket, and inserting bolt 33. In one commercial embodiment in accordance with FIGURE 5, spacer 32 is a ⅝ inch spacer, and bolt 33 is a one inch bolt. Thus bolt 33 does not interfere with the clamping action of clamping bolt 31. The remaining steps in the mounting and assembly process are the same as in the previous embodiments.

Figure 6:
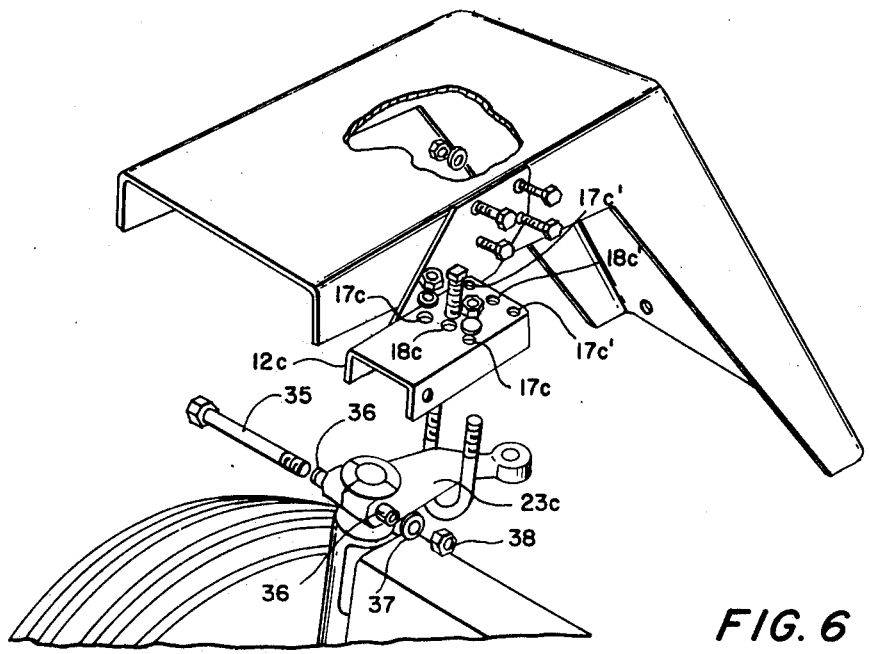

In the embodiment of FIGURE 6, horizontal clamping bolt 35 is a longer bolt which is provided with the fender assembly, and replaces the original horizontal clamping bolt which forms a standard part of the steering arm assembly. Spacers 36 are also provided with the fender assembly, but lock washer 37 and nut 38 are original parts of the steering arm assembly. To mount the embodiment of FIGURE 6, the original horizontal clamping bolt is removed from the steering arm, and the mounting bracket is fastened to the steering arm with the longer bolt 35. A spacer 36 is used on each side of the steering arm inside the channel walls of the mounting bracket. The remainder of the mounting and assembly procedure is the same as in the previous embodiments.

It will be noted that the embodiment of FIGURE 6 includes two sets of holes for the U-bolt and set screw, one set being shown at 17c and 18c, and the other set at 17c′ and 18c′. This permits the same mounting bracket to be used on two different tractor models of the same manufacturer, one set of holes being used when the bracket is mounted on one model, and the other set being used when the bracket is mounted on a different model with a slightly different steering arm.

Figure 7:
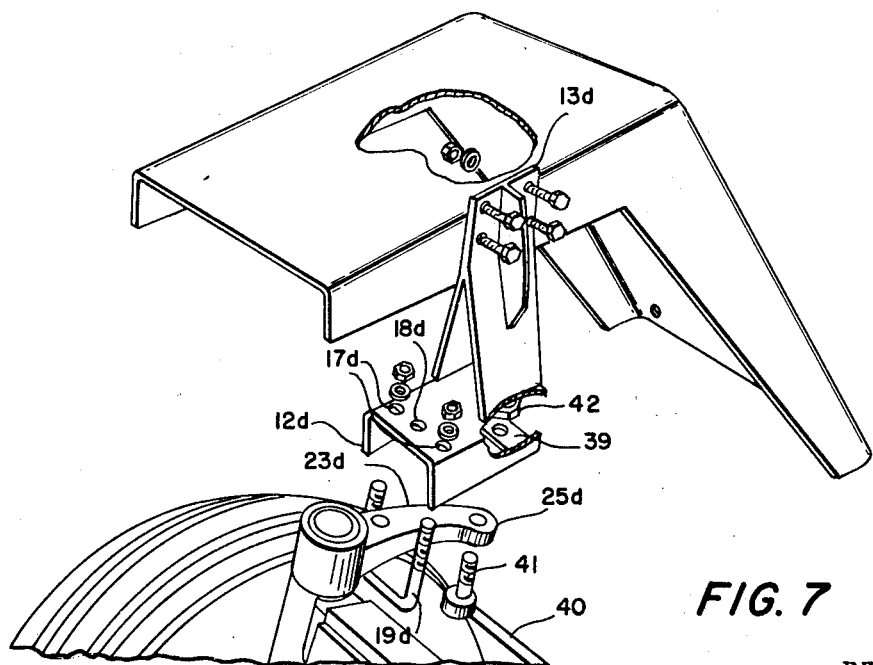

The embodiment shown in FIGURE 7 is for use with a well known make and model of tractor in which the steering arm 23d is mounted at a somewhat lower level than in the previous embodiments and is of a different design. To compensate for the lower mounting of the steering arm, the tab member 13d extends upwardly from the channel shaped body of the bracket 12d somewhat higher than in the previous embodiments, and accordingly is supported by angled legs and reinforced by a reinforcing flange as shown in FIGURE 7. The main body of the bracket 12d is fabricated from the same basic channel material as in the previous embodiments, but includes a cross member 39 with a hole formed therein to receive end bolt 41 of tie rod 40. Nut 42 and a lock washer (not shown) are the original parts which connect the end bolt 41 to the pivoted end 25d of the steering arm 23d. U-bolt 19d extends upwardly through holes 17d adjacent the pivoted end of the steering arm, rather than the pivotal end as in the previous embodiments. To mount the mounting bracket 12d, nut 42 and a lock washer (not shown) are removed from tie rod end bolt 41, and the mounting bracket is mounted on the steering arm with end bolt 41 passing upwardly through the steering arm and the hole formed in cross member 39. The bracket is aligned with the steering arm, and the lock washer and nut 42 are tightened on end bolt 41. The fender is bolted to tab member 13d of the mounting bracket, and the front end of the mounting bracket is connected to the steering arm by U-bolt 19d extending upwardly through holes 17d to receive the lock washers and nuts. A hole 18d may be provided for a set screw (not shown) as in the previous embodiments.

Figure 8:
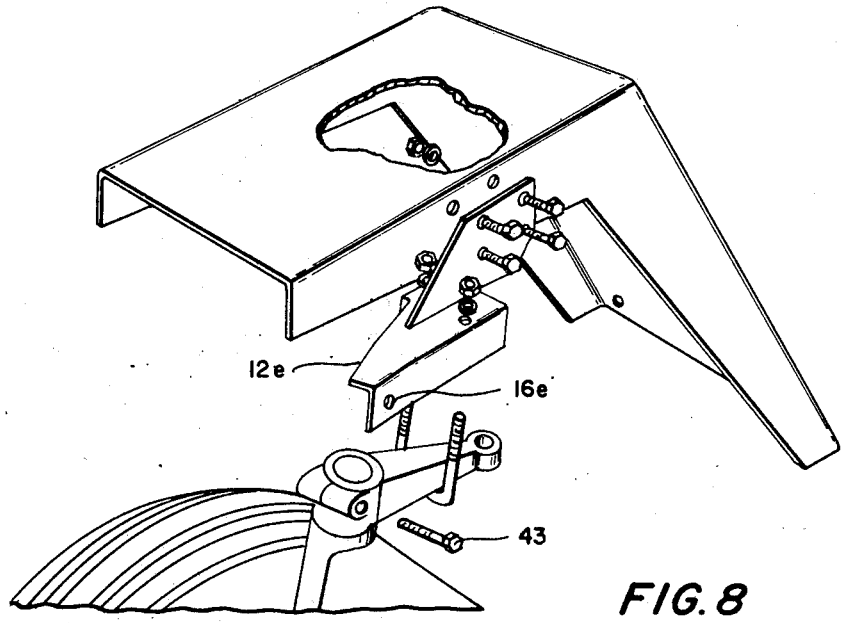

The modified mounting bracket shown in FIGURE 8 includes only a single hole 16e through which horizontal clamping bolt 43 passes to connect the front end of the mounting bracket to the steering arm. Clamping bolt 43 is an original part of the steering arm assembly. It is to be noted that the mounting bracket of this embodiment is fabricated from the same basic channel material as in the previous embodiments.

Figure 9:
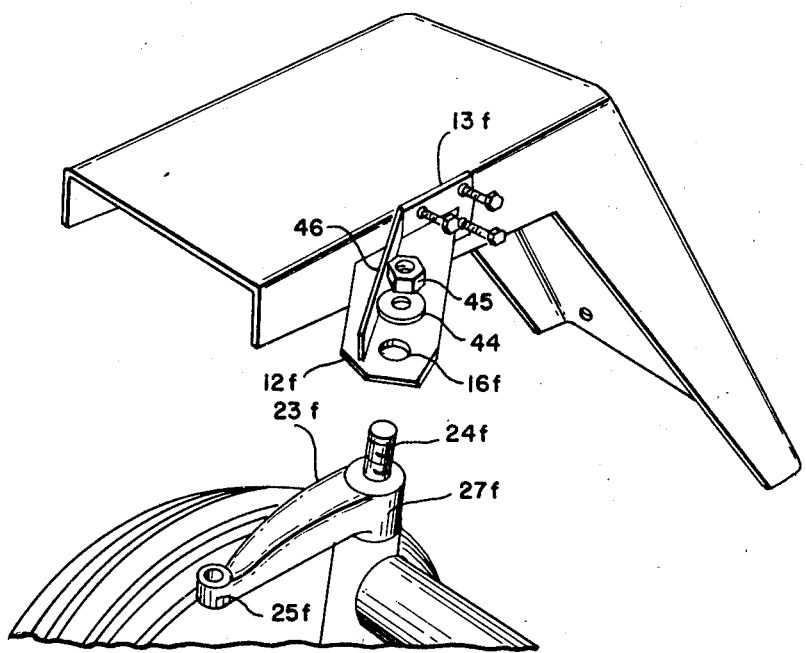

The steering arm 23f shown in FIGURE 9 is of a well known type in which the pivotal end 25f of the steering arm is forward of the pivoted end 27f and threaded spindle 24f. Mounting bracket 12f is mounted on and connected to the steering arm by passing spindle 24f through hole 16f and tightening lock washer 44 and nut 45 thereon. The lock washer and the nut are original parts of the steering arm assembly. Mounting bracket 12f is of flat plate construction, and includes a reinforcing rib 46 which terminates in tab member 13f. Since the mounting bracket 12f itself is cantilevered out from the steering arm and spindle 24f, it preferably is fabricated from somewhat heavier metal stock than in the previous embodiments.

Figure 10:
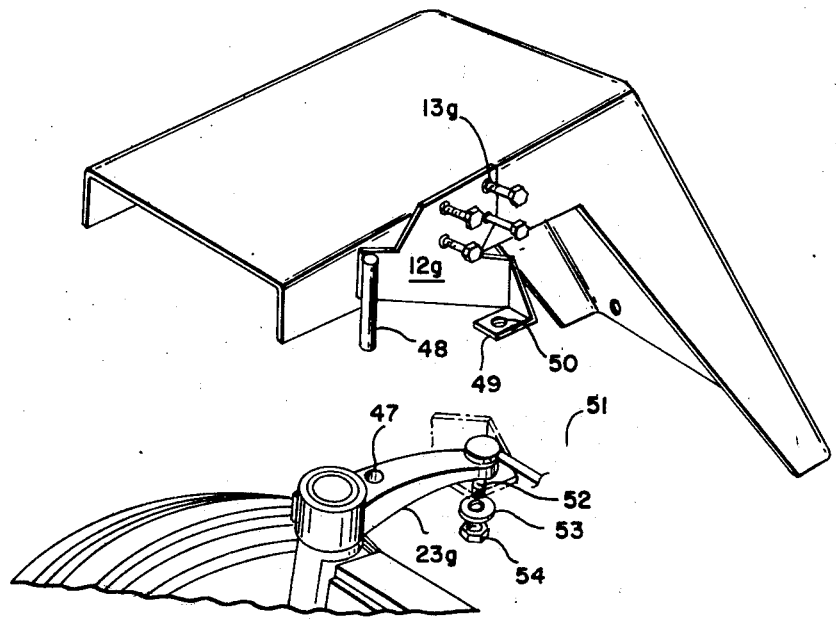

The steering arm 23g shown in FIGURE 10 is similar to the steering arm 23d of FIGURE 7, but in the steering arm assembly of FIGURE 10 end bolt 52 of tie rod 51 passes downwardly through a hole in the free end of the steering arm. The mounting bracket 12g of FIGURE 10 includes a pin 48 for insertion in hole 47 of the steering arm, and a flange 49 with a hole 50 to receive end bolt 52. Tab member 13g is provided for connection to the fender in the same general manner as in the previous embodiments. To mount the embodiment of FIGURE 10, nut 54 and lock washer 53 are removed from end bolt 52. Pin 48 is inserted into hole 47 in the steering arm, and the mounting bracket is swung into the position indicated in broken lines, with flange 49 under the steering arm. End bolt 52 must be raised to permit the flange 49 to move into this position. End bolt 52 is then passed through hole 50, and flange 49 is connected to the steering arm by replacing and tightening lock washer 53 and nut 54. The embodiment of this figure is usable with a number of tractor models, but in mounting the bracket on some of these models it may be necessary to loosen the lug nuts and tilt the wheel outwardly.

Figure 11:
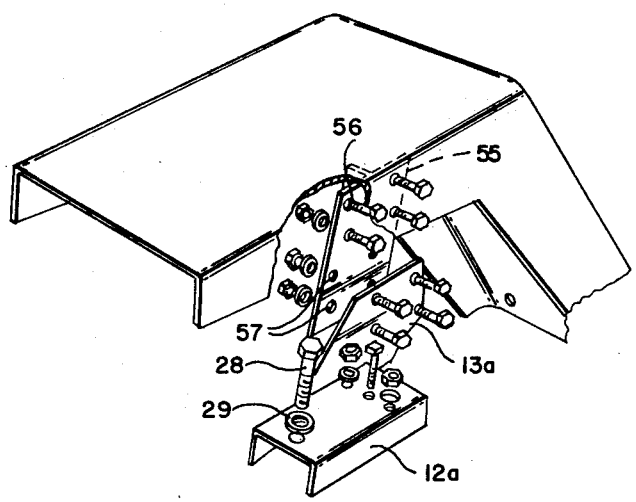
FIGURE 11 is an exploded perspective view of the embodiment of FIGURE 4a, but also illustrating an additional clearance member which can be used with any of the embodiments to provide additional vertical clearance between the wheel and the fender.

The mounting bracket shown in FIGURE 11 is the same as in FIGURE 4a, and is illustrated in combination with an additional clearance member 55 which may be used with any of the embodiments of the invention. The particular member 55 shown is designed to elevate the fender an additional three inches, and is of metal plate construction provided with a reinforcing rib and with holes 56 and 57 arranged for alignment with the corresponding holes in the fender and the tab member of the mounting bracket, respectively. Clearance member 55 thus is bolted to the fender at its upper end and to the tab member of the mounting bracket at its lower end. In the particular construction shown in FIGURE 11, the holes 56 and 57 in the clearance member 55 are located so that the fender will be moved back as well as up when the clearance member is bolted to the fender and to the mounting bracket. The backward movement is achieved by arranging each pattern of four holes in the clearance member at an angle to the longitudinal axis of the clearance member. Thus it will be noted in FIGURE 11 that the two left-hand holes 57 are arranged at an angle to the left-hand edge of the clearance member 55, that is, a line through the center of the two holes 57 would extend at an angle to the edge of the clearance member and to the longitudinal axis of the clearance member. Clearance members can therefore be provided with the hole patterns so oriented as to move the fender in a desired direction and by any reasonably desired amount.

It will be apparent to those skilled in the art that various changes may be made in the details and arrangements of parts, and it is therefore desired not to be restricted to the precise constructions of the preferred embodiments herein disclosed.

Having thus described and shown exemplary embodiments of the invention, what it is desired to secure by Letters Patent of the United States is:

1. In combination, a tractor of the wide front wheel type having steerable front wheels located laterally beyond the adjacent body structure of the tractor, a steering arm located adjacent each wheel and mounted for pivotal movement in a plane above the rotational axis of the adjacent wheel for steering the wheel, a fender mounting bracket mounted on at least one of said steering arms for movement therewith and with the adjacent wheel, and a fender attached to and supported by said bracket and extending outwardly therefrom in a cantilever manner over the adjacent wheel and rearwardly and downwardly behind the adjacent wheel, whereby said fender turns freely with its adjacent wheel to prevent throwback of material by said front wheel.

2. Apparatus as claimed in claim 1 wherein said fender, at least in the area thereof above the adjacent wheel, comprises a generally laterally extending portion over the wheel and a generally downwardly extending portion located inwardly of the wheel, and said mounting bracket includes a generally upright fender mounting portion connected to said generally downwardly extending portion of said fender.

3. Apparatus as claimed in claim 2 wherein said generally upright fender mounting portion of said bracket includes a first upright member integral with said mounting bracket, and an additional clearance member bolted to and extending upwardly from said first upright member at one end, said additional clearance member being bolted at its other end to said generally downwardly extending portion of said fender, whereby the elevation of said fender can be varied by including said additional clearance member or by bolting said first upright member of said mounting bracket directly to said downwardly extending portion of said fender.

4. Apparatus as claimed in claim 1 wherein said tractor includes at least one threaded bolt-like member which secures said steering arm to some other member in the steering linkage, and wherein said mounting bracket is secured to said steering arm at least in part by said bolt-like member.

5. Apparatus as claimed in claim 4 wherein said bolt-like member passes in a generally vertical direction through the pivot axis of said steering arm and through a hole formed in a lateral surface of and adjacent one end of said mounting bracket to connect said mounting bracket to said steering arm.

6. Apparatus as claimed in claim 5 further comprising further attachment means located toward the other end of said mounting bracket connecting the mounting bracket rigidly but adjustably and detachably to said steering arm for generally upward and downward adjustment away from and toward said steering arm.

7. Apparatus as claimed in claim 6 wherein said further attachment means comprises a U-bolt extending around said steering arm and upwardly through said mounting bracket, and a set screw threadably engaged with said mounting bracket and extending downwardly therefrom to bear against the upper surface of said steering arm.

8. Apparatus as claimed in claim 4 wherein said mounting bracket has a lateral surface extending along the upper surface of said steering arm and at least one side wall depending downwardly therefrom, and said bolt-like member is a clamping bolt passing generally horizontally through said steering arm and through an opening formed in said side wall adjacent one end of said mounting bracket to connect said mounting bracket to said steering arm.

9. Apparatus as claimed in claim 8 further comprising further attachment means located toward the other end of said mounting bracket connecting the mounting bracket rigidly but adjustably and detachably to said steering arm for generally upward and downward adjustment away from and toward said steering arm.

10. Apparatus as claimed in claim 9 wherein said further attachment means comprises a U-bolt extending around said steering arm and upwardly through said mounting bracket, and a set screw threadedly engaged with said mounting bracket and extending downwardly therefrom to bear against the upper surface of said steering arm.

11. Apparatus as claimed in claim 4 wherein said bolt-like member connects a tie rod to said steering arm at the end thereof remote from the pivot axis thereof, and passes through an opening formed toward one end of said mounting bracket.

12. Apparatus as claimed in claim 11 further comprising a U-bolt extending around said steering arm and upwardly through said mounting bracket near the other end thereof.

13. Apparatus as claimed in claim 11 further comprising a pin integral with said bracket and extending generally vertically through a hole in said steering arm near the other end thereof.

14. For attachment to a front wheel steering arm of a wide wheel tractor for movement therewith during pivotal steering movement of the steering arm, a fender mounting bracket, means defining an opening adjacent one end of said bracket located and arranged to receive a bolt-like member which connects the steering arm to an adjacent member in a steering linkage, means for connecting the bracket adjacent its other end to a different part of the steering arm, and means carried by said bracket for supporting a fender in generally cantilever fashion over a wheel adjacent the steering arm.

15. Apparatus as claimed in claim 14 further comprising a fender bolted to said last mentioned means.

16. Apparatus as claimed in claim 15 wherein said means for connecting the bracket adjacent its other end comprises means for connecting the bracket adjustably for generally upward and downward adjustment away from and toward the steering arm, but rigidly in each adjusted position, so as to facilitate leveling of said fender to a desired orientation.

17. Apparatus as claimed in claim 16 wherein said means for connecting said bracket adjustably comprises a U-bolt for passing under and around the steering arm and upwardly through said mounting bracket for restraining movement of said bracket away from the steering arm, and an adjustable set screw passing downwardly through said bracket for bearing against the steering arm to restrain movement of said bracket toward the steering arm.

18. Apparatus as claimed in claim 16 wherein said opening is in a lateral surface of said bracket to receive a generally vertically oriented bolt-like member.

19. Apparatus as claimed in claim 16 wherein said mounting bracket is of channel shaped cross section, and said opening is formed in at least one of the side walls of the channel to receive a generally horizontally oriented bolt-like member.

20. Apparatus as claimed in claim 15 wherein said opening is formed adjacent one end of said bracket for receiving a tie rod end bolt passing through the end of the steering arm.

21. Apparatus as claimed in claim 20 wherein said means for connecting the bracket adjacent its other end comprises a U-bolt for passing under and around the steering arm and upwardly through said mounting bracket.

22. Apparatus as set forth in claim 20 wherein said means for connecting the bracket adjacent its other end comprises a pin carried by said bracket for insertion through an opening in the steering arm.

References Cited

UNITED STATES PATENTS

| 2,349,421 | 5/1944 | Green | 280—153 |
| 2,530,857 | 11/1950 | Campbell | 280—152 |
| 2,690,342 | 9/1954 | Willey | 172—517 X |

FOREIGN PATENTS

| 10,730 | 1913 | Great Britain. |

KENNETH H. BETTS, Primary Examiner